United States Patent [19]
Kor

[11] Patent Number: 5,419,359
[45] Date of Patent: May 30, 1995

[54] GAS AND LIQUID BACKFLOW-PREVENTING VALVE DEVICE FOR DRAINS

[75] Inventor: Bouko J. Kor, Winnipeg, Canada

[73] Assignees: Murray A. Grant; Harold N. Westdal, both of Winnipeg, Canada

[21] Appl. No.: 205,158

[22] Filed: Mar. 3, 1994

[51] Int. Cl.6 .......................... A47K 1/14; F16K 31/26
[52] U.S. Cl. .................... 137/247.15; 137/396; 137/398; 137/448; 4/688
[58] Field of Search ............... 137/247.15, 247.19, 137/247.13, 397, 398, 192, 409, 202, 448, 396, 403; 4/653, 681, 682, 688

[56] References Cited

U.S. PATENT DOCUMENTS

| 353,577 | 1/1886 | McConnell | 137/398 |
|---|---|---|---|
| 1,775,860 | 9/1930 | LaBour | 137/398 X |
| 1,878,964 | 2/1929 | Luff et al. | |
| 2,199,673 | 4/1938 | Ronning | |
| 2,617,491 | 11/1952 | Ross | 137/247.19 X |
| 3,397,714 | 8/1968 | Liljendahl | 137/247.15 |
| 3,460,561 | 3/1967 | Lomolino | 137/247.13 |
| 3,838,706 | 10/1974 | Klenk et al. | 137/247.19 |
| 4,088,149 | 5/1978 | Logsdon | 137/433 |
| 4,262,692 | 4/1981 | Sampson | 137/433 |
| 4,594,739 | 6/1986 | Watts et al. | 4/287 |
| 4,796,650 | 1/1989 | Hwang | 137/448 X |
| 4,882,789 | 11/1989 | Kraverath | 4/661 X |

Primary Examiner—Martin P. Schwadron
Assistant Examiner—Kevin L. Lee

[57] ABSTRACT

A valve device for use with a drain provided with a pipe having an entrance for collecting liquid leading to a P-trap beneath the entrance. The device comprising an open vessel, in use positioned at the entrance of the pipe, having walls and a floor defining an internal chamber, the floor having an opening for permitting liquid collected in the chamber to pass into the pipe. The device is provided with a valve arranged to seat in the opening from below and is movable between a closed position sealing the opening against gas and liquid flow from the pipe to the chamber and an open position spaced from the opening beneath the floor. A float is positioned in the internal chamber and a linkage transfers buoyancy force exerted on the float by liquid collected in the chamber to the valve to cause the valve to move from the closed position to the open position when the liquid exceeds a certain depth in the chamber. The device provides an effective way of preventing backflow of gases and liquids from the drain, but overcomes problems caused by gas pressure build-up between the P-trap and the valve that would otherwise prevent the valve from opening properly.

12 Claims, 3 Drawing Sheets

GAS AND LIQUID BACKFLOW-PREVENTING VALVE DEVICE FOR DRAINS

BACKGROUND OF THE INVENTION

I. Field of the Invention

This invention relates to gas and liquid backflow-preventing devices for drains e.g. floor drains used in buildings to prevent flooding or to remove spillage. More particularly, the invention relates to devices of this type which permit liquid to pass into drains without difficulty, but prevent gases and water from escaping from the interior of the drains.

II. Description of the Prior Art

It is commonplace to provide drains of many kinds with U-shaped bends at or near their entrances in order to prevent escape of gases from the interior of the drains (such bends are often referred to as "P-traps"). The U-shaped bends retain a portion of the liquid passing through the drains and the liquid prevents the passage of gases from the drains to the exterior, or vice versa, but allows the passage of liquids in both directions.

Unfortunately, this form of gas sealing arrangement fails if a drain is used infrequently because the liquid trapped in the U-shaped bend dries out after a period of time, if it is not replenished, and then gases are free to escape from the drain. There are many instances in which drains are only infrequently used, so this problem can be quite widespread. For example, floor drains are frequently provided in the basements of homes to avoid flooding but such drains are rarely used and drying out of the P-trap is commonplace. This may not only result in the escape of unpleasant odours into the dwelling, but may also result in the release of dangerous gases such as radon or inflammable vapours.

This problem has been recognized in the past and various attempts have been made to provide alternative arrangements. For example, U.S. Pat. 4,744,109 issued May 17, 1988 to Grenville K. Yuill relates to a gas-sealing insert that fits into the entrance of a floor drain and makes use of a ball valve or movable plate to seal a small additional P-trap so that the insert remains closed against gases even if liquid in the trap dries out. The ball valve or hinged plate is located downstream of the trap so that it is automatically moved out of the way of liquids when the drain is in use. However, when the flow of liquid stops, the valve is biased by gravity or a spring to return to the sealing position. Inserts of this type have been very effective, but they have the disadvantage that the tubing used for the trap must be quite narrow because a U-shaped portion of the trap has to be positioned inside the mouth of the drain. This limits the flow of liquid the drain can accommodate and may result in backing up of the liquid upstream of the insert. Moreover, with inserts of this type, the ball valve or hinged plate is not very accessible, so if a solid article lodges in the device and impedes the movement of the valve, it is not easy to remove the article or even to see that the insert may not be functioning correctly.

To avoid these disadvantages, we have made attempts to eliminate the small additional P-trap and to position a movable gas-sealing valve closer to the entrance of the drain so that it is more visible and more easily accessible. However, if a downwardly movable spring loaded valve is provided at the entrance to the drain a short distance upstream of a conventional P-trap, we have found that an unexpected problem arises. If water enters the drain quite slowly, as is often the case, the water seeps around the edges of the valve without opening the valve sufficiently to allow gas to escape upwardly through the valve. Because the P-trap is rarely full to the maximum extent that results in water introduced on the upstream side causing displacement of an equal amount of water on the downstream side, water seepage through the valve starts to fill the drain tube leading from the valve to the P-trap and this compresses air present in this part of the drain tube. The resulting air pressure acts on the underside of the valve to seat the valve more firmly in the closed position, so that additional water flow through the valve is at some stage prevented. This causes water to collect above the valve until the depth of water creates a pressure on the valve that exceeds the air pressure beneath the valve and any spring force used to keep the valve closed. The valve is then opened, but the resulting flow of water through the valve may be erratic because the valve only opens as far as necessary and the compressed gas may not easily escape upwardly around the valve.

This unexpected problem has made such valve designs very unreliable and has undermined their commercial potential.

There is therefore a need for improved gas sealing devices for drains that function more advantageously.

SUMMARY OF THE INVENTION

An object of the invention is to provide a device that may be used to seal drains against backflow of gases and backflow of liquids while permitting liquids to flow in the intended direction substantially unimpeded through the drains.

Another object of the invention is to provide a device for sealing drains against backflow of gases while minimizing disturbances in the normal flow of liquids through the drains.

According to one aspect of the invention, there is provided a valve device for use with a drain provided with a drain pipe having an entrance for collecting liquid leading to a P-trap beneath the entrance. The device comprising an open vessel, in use positioned at the entrance of the drain pipe, having walls and a floor defining an internal chamber, the floor having an opening for permitting liquid collected in the chamber no pass into the drain pipe. The device is provided with a valve arranged to seat in the opening from below and is movable between a closed position sealing the opening against gas and liquid backflow from the pipe to the chamber, and an open position spaced from the opening beneath the floor. A float is positioned in the internal chamber and a linkage transfers buoyancy force exerted on the float by liquid collected in the chamber to the valve to cause the valve to move from the closed position to the open position when the liquid accumulates in the chamber.

DETAILED DESCRIPTION OF THE PREFERRED EMBODIMENTS

Figure 1:
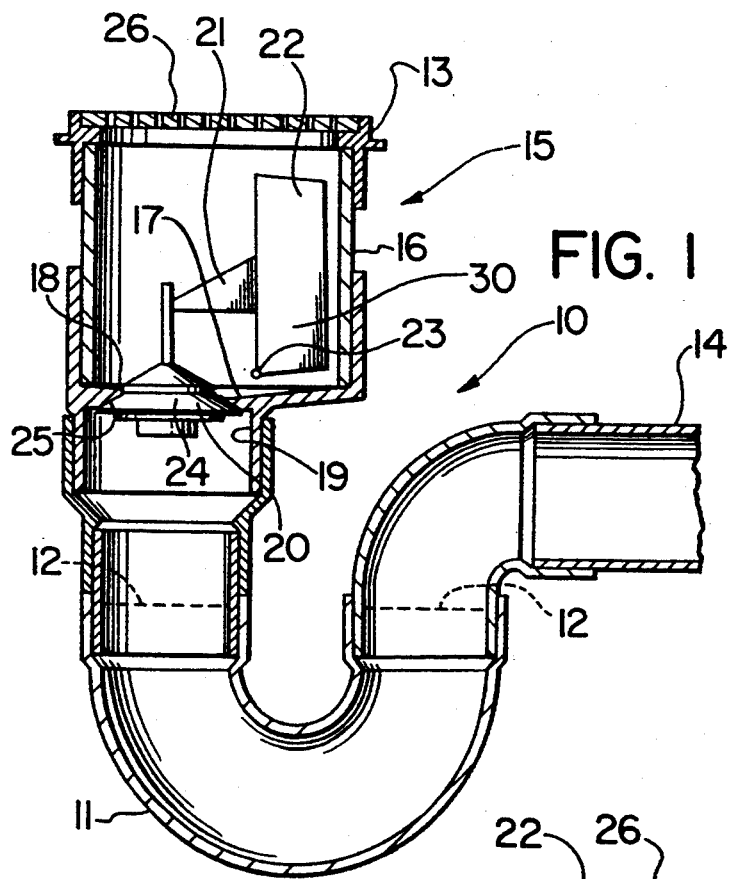
FIG. 1 is a cross-section of a drain having a P-trap and an entrance and provided with a device according to one preferred form of the invention in the entrance of the drain.

FIGS. 1 to 4 show one form of a preferred device according to the present invention positioned within an entrance of a vertical entrance pipe of a domestic floor drain indicated generally by reference numeral 10.

Figure 2:
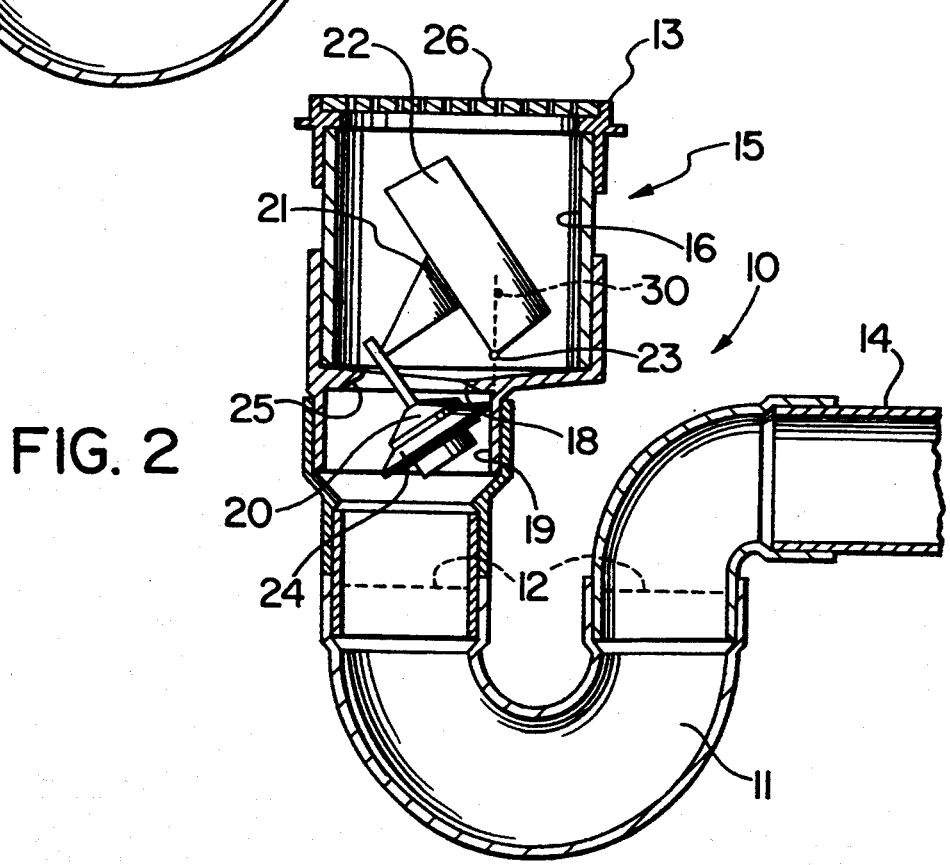
FIG. 2 is a cross-section similar to FIG. 1 showing the valve of the device according to the invention in the open position to allow liquid to flow through the drain.

Referring to FIGS. 1 and 2, the drain 10 has a U-shaped bend 11 forming a conventional P-trap. The P-trap normally holds a body of water 12 (shown in dotted lines) that forms a gas seal between an entrance 13 of the drain and an interior drain pipe 14. As already indicated, if this body of water dries out, gases may then pass freely from interior pipe 14 to the entrance 13 of the drain. Moreover, the body of water does not impede a flow of water through the drain in either direction, thus disadvantageously permitting water from the drain to pass back through the entrance 13 when the drain backs up.

To prevent the escape of gases and backflow of water, a device 15 according to the invention is positioned at the entrance 13 of the drain. The device 15 includes a tubular vessel having an internal chamber 16 that is slightly larger than the remainder of the pipes of the drain. The chamber 16 forms part of the piping of the drain and is provided with a floor 17 penetrated by a circular opening 18 that allows water to flow from the entrance of the drain to the P-trap. The circular opening 18 is provided with a sealing valve 20 that seats from below and is capable of moving between a closed position as shown in FIG. 1 and a fully open position as shown in FIG. 2. This movement is accommodated by a slightly enlarged tubular projection 19 depending from the floor 17 that does not impede the movements of the valve and forms a connection for attachment of the tubular vessel to the remainder of the drain piping. When the valve is in the closed position, which is the normal position, the valve 20 seals the drain against the backflow of gases and water.

Figure 3:
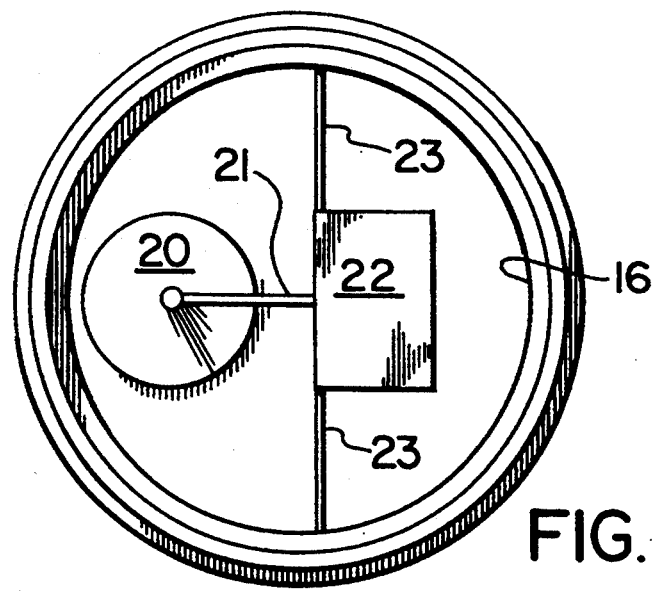
FIG. 3 is a top plan view of the device of FIGS. 1 and 2.

The valve 20 is attached via linkage 21 to a float 22 that is pivotally attached to a horizontal shaft 23 at its lowermost end. In turn, the shaft is secured at its ends to the interior walls of the chamber as shown in FIG. 3, or to a cradle arrangement (not shown) upstanding from the floor 17 of the chamber 16. These arrangements allows the float 22 to tilt around the shaft 23 as a pivot, thus moving the valve 20 to the open position as shown in FIG. 2.

When the chamber 16 is empty of water, the weight of the float acts through a center of gravity 30 on the opposite side of the shaft 23 to the valve 20. The float is made to be heavier than the valve so that the float causes a frustoconical edge 24 of the valve to seat firmly against a mating lower edge 25 of the floor 17 around the opening 18. If desired, one or both of the edge 24 of the valve and the edge 25 of the opening may be coated with or made of an elastomeric or yieldable material to ensure a high degree of water and gas tightness at the valve seat.

As water enters the chamber 16 from drain entrance 13, e.g. through a perforated cover plate 26, it encounters the valve 20 in the closed position that causes the water to be retained at the bottom of the chamber. As the water gradually rises in the chamber, it begins to surround the float 22 from below and exerts and upward buoyancy force on the float that begins to counteract both the weight of the float and any upward force exerted by compressed gas trapped beneath the valve 20 above the body 12 of water in the P-trap. As the water level rises, the buoyancy force increases until it exceeds the excess weight of the float and the force of the compressed gas and tilts the valve towards the open position as shown in FIG. 2. This relieves the gas pressure above the P-trap and allows the water in the chamber to flow through the drain.

The valve is essentially self-regulating for the following reasons. When there is little or no excess gas pressure beneath the valve 20, and small amounts of water enter the chamber 16, the valve may allow water to seep slowly through the hole 18 into the P-trap. This causes the level of the body of water in the trap to rise on both sides of the U-shaped bend (until the level reaches that of the interior drain 14, whereupon excess water flows away). The rising water level beneath the valve causes the gas trapped beneath the valve to become compressed, and this seats the valve more firmly against the floor 17, thus reducing or preventing further seepage of water. As more water enters the chamber 16, the water level rises and the float eventually opens the valve in the manner explained above. The downward force on the valve causes the valve to unseat much sooner than would be the case if the weight of water alone in chamber 16 were relied on to open the valve. Moreover, the float causes the valve to unseat evenly all around its periphery, making it possible for gas to escape quickly from the pipe beneath. The valve tends to "glub" as it opens, i.e. a bubble of gas quickly escapes the moment the valve opens and forces its way through the accumulated water. This "glubbing effect" quickly depressurizes the drain and makes subsequent drainage very efficient.

When water enters the chamber 16 continuously in large quantities, the valve is quickly opened in the indicated manner and is kept in the open position by the force or weight of water passing over and around the valve as the water passes through the opening 18. Consequently, the valve stays open as long as required to accommodate the flow of water into the drain. When this flow stops, the excess weight of the float causes the valve to move to the closed position once again.

Even if the pressure of gas beneath the valve becomes unusually high, the float may be designed in such a manner that the buoyancy force can always overcome the pressure and open the valve before the float becomes fully submerged.

Figure 4:
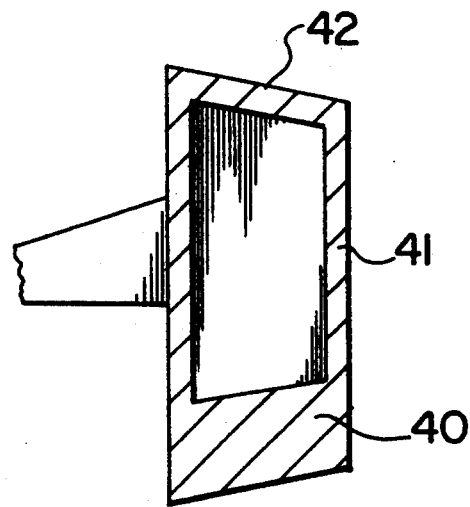
FIG. 4 is an enlarged cross-section of the float present in the device of FIGS. 1, 2 and 3.

The design and pivotal attachment of the float 22 in this embodiment of the invention is such that the center of gravity 30 of the float is almost exactly vertically above the pivot 23 when the valve 20 is in the fully open position as shown in FIG. 2, but remains just slightly to the side causing the float to return to the vertical (closed) position. To achieve this, the float must have quite a low center of gravity and this can be achieved by making the float hollow but with a lower wall of significantly enhanced thickness compared to the other walls of the float. Such a design is shown in FIG. 4 in which bottom wall 40 of the float is several times thicker than the sidewalls 41 and the top wall 42 of the float.

By arranging the center of gravity in the stated way, very little force is required to maintain the valve 20 in the fully open position of FIG. 2 since there is very little turning moment exerted by the weight of the float around the pivot 23. The force exerted by water draining through the hole 18 over the open valve 23 is therefore sufficient to keep the valve fully open. However, the slight turning moment exerted on the float 22 by virtue of the slight vertical misalignment of the pivot 23 and the center of gravity 30 is sufficient to return the float to the upright (untilted) position of FIG. 1 when no more water is draining through the circular hole 18. The inner wall of the projection 19 limits the tilting movement of the valve 20 and thus ensures that the float never tilts to such an extent that its center of gravity moves to the same side as the valve, thus making it possible for the valve not to close.

It will also be appreciated that the shape of the float itself helps to keep the valve 20 open when water is flowing into the chamber 16 in substantial amounts because water flowing onto the float 22 from above in the open position of FIG. 2 tends to keep the float tilted to the open position.

Consideration is also given to the buoyancy:weight ratio of the float when the float starts to become surrounded by water. This ratio is affected by the material from which the float is made (i.e. the density of the material of the float) which affects its weight, and the shape of the float, particularly at its lower end that is surrounded with water first. Clearly, the heavier the float, the greater will be the buoyancy force required to tilt the valve to the position shown in FIG. 2 and the higher the water level in the chamber 16 will have to rise around the float to overcome the weight force and the upward force on the valve 20 due to excess gas pressure below the valve. In general, the float should be of such a shape and weight that it is tilted to the open position of FIG. 2 significantly before the water level reaches the mid horizontal plane of the float 22. When the water rises above this level, the buoyancy affect may interfere with the desired tilting action of the float.

While the arrangement shown in FIGS. 1 to 4 is particularly effective, actuating mechanisms of other kinds for positively opening and closing valve 20 in response to water levels in chamber 16 may be employed in the present invention.

Figure 5:
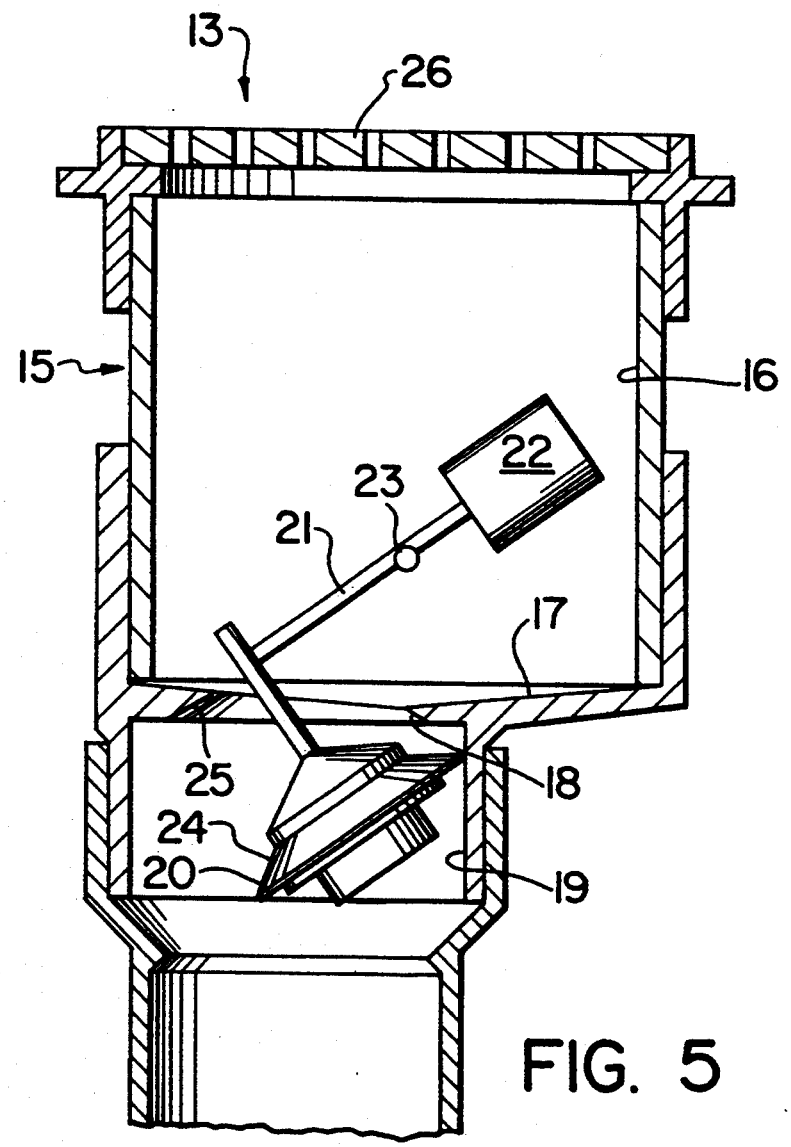
FIG. 5 is a partial cross-sectional view similar to FIG. 2 of an alternative embodiment of the invention.

One such alternative arrangement is shown in FIG. 5 which has a "teeter-totter" type of arrangement of the valve 20 and float 22 in which linkage 21 is rotatable about a horizontal shaft 23 acting as a pivot.

This embodiment functions in much the same way as the embodiment shown in FIGS. 1-4 except that the centre of gravity 30 of the float remains to one side of the shaft 23 when the float is in the fully open position. While this maintains a greater turning movement around the shaft 23 tending to return the valve to the closed position, the relative forces on the opposite sides of the linkage 21 can be matched in such a way that the valve remains open as long as the amount of water flowing through the chamber is substantial.

what we claim is:

1. A valve device for use with a floor drain that is vulnerable to driving-out provided with a drain pipe having an entrance for collecting liquid leading to a P-trap beneath said entrance, said P-trap being charged with liquid only from said entrance, said device comprising:
a vessel, in use positioned at said entrance of said drain pipe, having walls and a floor defining an internal chamber, said chamber having an upper opening for allowing liquid to enter the chamber from outside, and a lower opening in said floor for permitting liquid collected in the chamber to pass into said drain pipe;
a perforated floor drain cover plate positioned at said upper opening of said chamber;
a valve arranged to seat in said lower opening from below and movable between a closed position and an open position spaced from said opening beneath said floor, said valve having a substantially frusto-conical edge seating, when said valve is in said closed position, against a mating surface surrounding said opening, and at least one of said edge and said mating surface comprising an elastomeric or yieldable material for sealing said opening against gas and liquid backflow from said drain pipe to said chamber;
a float positioned in said internal chamber; and
a linkage transferring buoyancy force exerted on said float by said liquid collected in said chamber to said valve to cause said valve to move from said closed position to said open position when said liquid exceeds a predetermined depth in said chamber.

2. A device according to claim 1 wherein said floor of said vessel has a tubular downward projection surrounding said lower opening for seating at said entrance of said drain pipe, said projection being sized to avoid hindrance of said movement of said valve from said closed position to said open position and vice versa.

3. A device according to claim 1 wherein said float is held in said chamber by a generally horizontal shaft connected to said float at a point of attachment adjacent to a lower end of the float, and by said linkage connecting said float to said valve, said float being tiltable about said shaft such that tilting movements of said float cause said linkage to push said valve downwardly away from said floor of said chamber from said closed position to said open position.

4. A device according to claim 3 wherein said float has a weight acting at a center of gravity, said center of gravity being positioned such that said center is maintained on an opposite side of said shaft to said valve in all positions of said valve so that the weight of the float urges the valve to said closed position.

5. A device according to claim 4 wherein, when said valve is in said open position, said center of gravity is almost directly above said shaft so that a return force on said valve is minimal.

6. A device according to claim 1 wherein said linkage is elongated and has said valve fixed at one end and said float fixed at an opposite end, and wherein said linkage is pivotable at a point between said one end and said opposite end about a generally horizontal shaft.

7. A combined drain and sealing valve, comprising:
a drain pipe having an entrance and a generally vertical entrance pipe communicating with a P-trap that is vulnerable in use to drying-out and that is charged with liquid only from said entrance;
an open vessel positioned at said entrance of said pipe, having walls and a floor defining an internal chamber, said floor having an opening for permitting liquid collected in the chamber to pass into said entrance pipe;
a valve arranged to seat in said opening from below and movable between a closed position and an open position spaced from said opening beneath said floor, said value having a substantially frusto-conical edge seating, when said valve is in said closed position, against a mating surface surrounding said opening, and at least one of said edge and said minting surface comprising an elastomeric or yieldable material for sealing said opening against gas and liquid backflow from said drain pipe to said a float positioned in said internal chamber; and a linkage transferring buoyancy force exerted on said float by liquid collected in said chamber to said valve to cause said valve to move from said closed position to said open position when said liquid exceeds a minimum depth in said chamber.

8. A device according to claim 7 wherein said floor of said vessel has a tubular downward projection surrounding said lower opening for seating at said entrance of said drain pipe, said projection being sized to avoid hindrance of said movement of said valve from said closed position to said open position and vice versa.

9. A device according to claim 7 wherein said float is held in said chamber by a generally horizontal shaft connected to said float at a point of attachment adjacent to a lower end of the float, and by said linkage connecting said float to said valve, said float being tiltable about said shaft such that tilting movements of said float cause said linkage to push said valve downwardly away from said floor of said chamber to said open position.

10. A device according to claim 9 wherein said float has a weight acting at a center of gravity, said center of gravity being positioned such that said center is maintained on an opposite side of said shaft to said valve in all positions of said valve so that the weight of the float urges the valve to said closed position.

11. A device according to claim 10 wherein, when said valve is in said open position, said center of gravity is almost directly above said shaft so that a return force on said valve is minimal.

12. A device according to claim 7 wherein said linkage is elongated and has said valve fixed at one end and said float fixed at an opposite end, and wherein said linkage is pivotable at a point between said one end and said opposite end about a generally horizontal shaft.

* * * * *